(12) United States Patent
Blea et al.

(10) Patent No.: US 7,657,714 B2
(45) Date of Patent: Feb. 2, 2010

(54) APPARATUS AND METHOD TO PROVIDE ONE OR MORE COMMANDS TO A DATA STORAGE AND RETRIEVAL SYSTEM

(75) Inventors: David R. Blea, Tucson, AZ (US); Errol J. Calder, Vail, AZ (US); Gregory E. McBride, Vail, AZ (US); Todd B. Schlomer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 11/219,476

(22) Filed: Aug. 31, 2005

(65) Prior Publication Data

US 2007/0050570 A1   Mar. 1, 2007

(51) Int. Cl.
*G06F 13/00* (2006.01)
(52) U.S. Cl. ........................ 711/154; 711/100
(58) Field of Classification Search .......... 711/100, 711/111, 112, 154; 709/208
See application file for complete search history.

(56) References Cited

U.S. PATENT DOCUMENTS

| | | | | | |
|---|---|---|---|---|---|
| 5,675,507 | A | * | 10/1997 | Bobo, II | 709/206 |
| 5,771,354 | A | * | 6/1998 | Crawford | 709/229 |
| 5,913,028 | A | | 6/1999 | Wang et al. | |
| 6,006,342 | A | * | 12/1999 | Beardsley et al. | 714/5 |
| 6,249,861 | B1 | * | 6/2001 | Tremblay et al. | 712/204 |
| 6,442,554 | B1 | * | 8/2002 | Reddy et al. | 707/100 |
| 6,760,760 | B1 | | 7/2004 | McGrane | |
| 2003/0014269 | A1 | * | 1/2003 | Malkin et al. | 705/1 |
| 2003/0028723 | A1 | * | 2/2003 | Segev et al. | 711/113 |
| 2003/0212752 | A1 | * | 11/2003 | Thunquest et al. | 709/213 |
| 2004/0210584 | A1 | | 10/2004 | Nir et al. | |
| 2004/0243778 | A1 | * | 12/2004 | Barrios et al. | 711/165 |
| 2006/0106829 | A1 | * | 5/2006 | Budaya et al. | 707/100 |

OTHER PUBLICATIONS

IBM, "IBM TotalStorage Enterprise Storage Server Implementing ESS Copy Services with IBM eServer zSeries, (Linux with zSeries and ESS: Essentials)", Redbooks, Sep. 2003, pp. 1-102.

* cited by examiner

*Primary Examiner*—Matt Kim
*Assistant Examiner*—Michael C Krofcheck
(74) *Attorney, Agent, or Firm*—Dale F. Regelman; Quarles & Brady LLP (57) ABSTRACT

A method is disclosed to provide commands to an information storage and retrieval comprising one or more data storage devices, where one or more first communication links interconnect one or more host computers and the data storage and retrieval system. The method supplies a computing device, where that computing device is external to the data storage and retrieval system, and where that computing device is external to each of the one or more host computers. Applicants' method further supplies a second communication link interconnecting the computing device and the data storage and retrieval system. The computing device generates a command signal, where said command signal comprises one or more command control words and a header. The computing device then provides that command signal to the data storage and retrieval system via the second communication link.

29 Claims, 6 Drawing Sheets

APPARATUS AND METHOD TO PROVIDE ONE OR MORE COMMANDS TO A DATA STORAGE AND RETRIEVAL SYSTEM

FIELD OF THE INVENTION

This invention relates to an apparatus and method to generate and provide commands to a data storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices, where both the requests and the information are communicated over one or more data channels interconnecting the data storage and retrieval system and one or more host computers. Upon receipt of a read request, the system, in certain embodiments, recalls information from the one or more data storage devices and moves that information to a data cache. Thus, the system is continuously moving information to and from one or more host computers, and/or to and from a plurality of data storage devices, and/or to and from one or more data caches.

In addition to reading and writing data, a data storage and retrieval system may receive copy services requests to copy information from a source volume to a target volume. As a general matter, such copy services requests are generated by the one or more host computers, and provided seriatim to the data storage and retrieval system. Generating and providing such copy services requests necessarily requires the one or more host computers to allocate resources to those copy services requests. Receiving, interpreting, and executing such copy services commands necessarily requires the data storage and retrieval system to allocate resources for those copy services requests.

What is needed is an apparatus and method to generate a plurality of commands, such as for example a plurality of copy services requests, external to the one or more host computers, and provide that plurality of commands to the data storage and retrieval system without using one or more data channels.

SUMMARY OF THE INVENTION

Applicants' invention comprises an apparatus and method to provide commands to an information storage and retrieval comprising one or more data storage devices, wherein one or more first communication links interconnect one or more host computers and the data storage and retrieval system. Applicants' method supplies a computing device, where that computing device is external to the data storage and retrieval system, and where that computing device is external to each of the one or more host computers. Applicants' method further supplies a second communication link interconnecting the computing device and the data storage and retrieval system.

The computing device generates a command signal, where said command signal comprises one or more command control words and a header. The computing device then provides that command signal to the data storage and retrieval system via the second communication link.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in a data storage and retrieval system which comprises two clusters, each cluster comprising a plurality of device adapters and a data cache. The following description of Applicants' method is not meant, however, to limit Applicants' invention to data storage and retrieval system comprising a plurality of clusters, as the invention herein can be generally applied to providing commands to a data storage and retrieval system.

In certain embodiments, Applicants' data storage and retrieval system includes a plurality of host adapters. In the illustrated embodiment of FIG. 1, system 100 comprises host adapters 102-105, 107-110, 112-115 and 117-120. In other embodiments, Applicants' data storage and retrieval system includes fewer than 16 host adapters. In still other embodiments, Applicants' data storage and retrieval system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Figure 1:
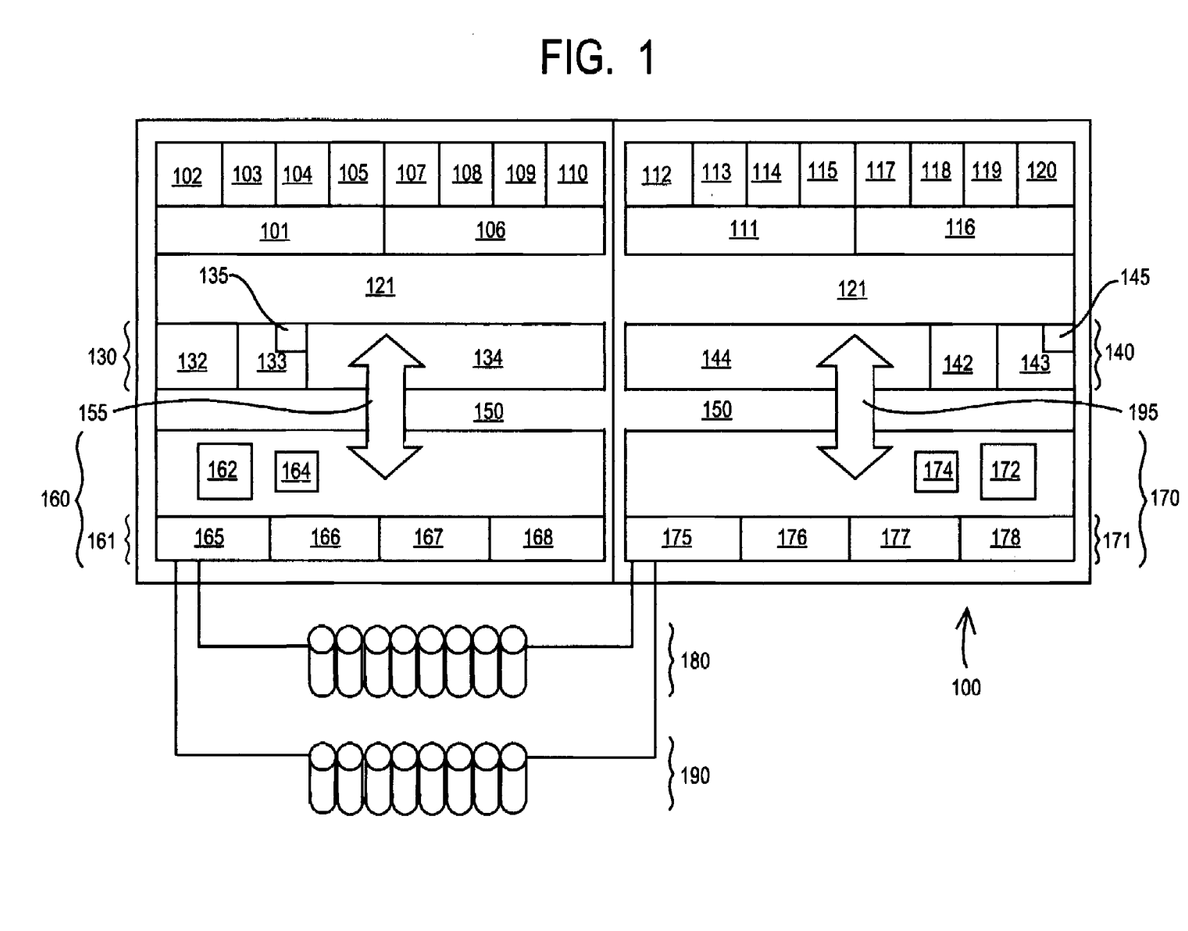
FIG. 1 is a block diagram showing one embodiment of Applicants' data storage and retrieval system.

Each host adapter may comprise one or more Fibre Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' data storage and retrieval system. Similarly, in certain embodiments, one or more host adapters, processor portion 140, one or more device adapters are disposed on a second control card disposed in Applicants' data storage and retrieval system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
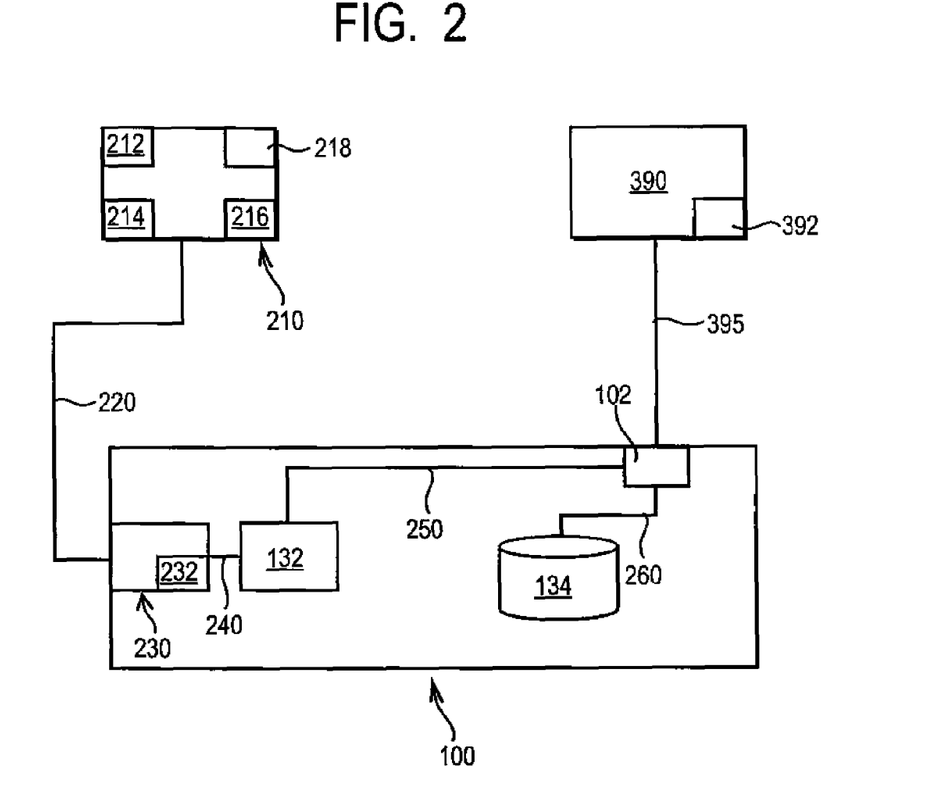
FIG. 2 is a block diagram showing the data storage and retrieval system of FIG. 1 interconnected to a host computer by a first communication link and interconnected to a computing device by a second communication link.

The illustrated embodiment of FIG. 2 shows Applicants' data storage and retrieval system 100 interconnected with host computer 390 via first communication link 395 and a first interface 270. Host computer 390 comprises a computer system, such as a mainframe, personal computer, workstation, and combinations thereof, including an operating system such as Windows, AIX, UNIX, MVS, LINUX, etc. (Windows is a registered trademark of Microsoft Corporation; AIX is a registered trademark of, and MVS is a trademark of, the IBM Corporation; UNIX is a registered trademark in the United States and other countries licensed exclusively through The Open Group; and LINUX is a registered trademark of Linus Torvald). In certain embodiments, host computer 390 further includes a storage management program 392. The storage management program 392 comprises the functionality of storage management type programs known in the art that manage the transfer of data to and from a data storage and retrieval system, such as the IBM DFSMS implemented in the IBM MVS operating system.

In certain embodiments, communication link 395 is selected from the group consisting of a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Fibre Channel interconnection, and combinations thereof.

Using prior art apparatus and methods, both data and commands are communicated from host computer 390 to data storage and retrieval system 100 over communication link 395. First communication link 395 interconnects with data storage and retrieval system 100 through a first communication interface, wherein that first communication interface comprises a host adapter, such as for example host adapter 102 (FIGS. 1, 2). Host adapter 102 passes data sent by host 390 to data cache 134 via communication link 260, and passes commands sent by host 390 to processor 132 via communication link 250.

By "data," Applicants mean first information provided by a host computer to Applicants' data storage and retrieval system, where that first information is written to a data cache, such as for example data cache 134 and/or 144, and/or written to one or more data storage arrays, such as for example data storage array 180 (FIG. 1) and/or 190 (FIG. 1).

By "command," Applicants mean second information provided to a data storage and retrieval system, where that second information causes the data storage and retrieval system to, for example and without limitation, read, write, migrate, and/or copy first information, and wherein such second information is not written to a data cache or to a data storage array.

The illustrated embodiment of FIG. 2 shows a single host computer and single first communication link 395. In other embodiments, Applicants' data storage and retrieval system communicates with a plurality of host computers using a plurality of first communication interfaces and a plurality of host adapters.

FIG. 2 further shows computing device 210 interconnected with data storage and retrieval system 100 via second communication link 220, wherein that second communication link 220 does not interconnect with a host adapter. Rather in the illustrated embodiment of FIG. 2, second communication link 220 interconnects with system 100 via second interface 230. In certain embodiments, second interface 230 comprises a web server capable of communicating using a Transmission Control Protocol/Internet Protocol (TCP/IP). In certain embodiments, interface 230 comprises memory 232. Second interface 230 is interconnected with processor 132 by communication link 240.

Figure 4A:
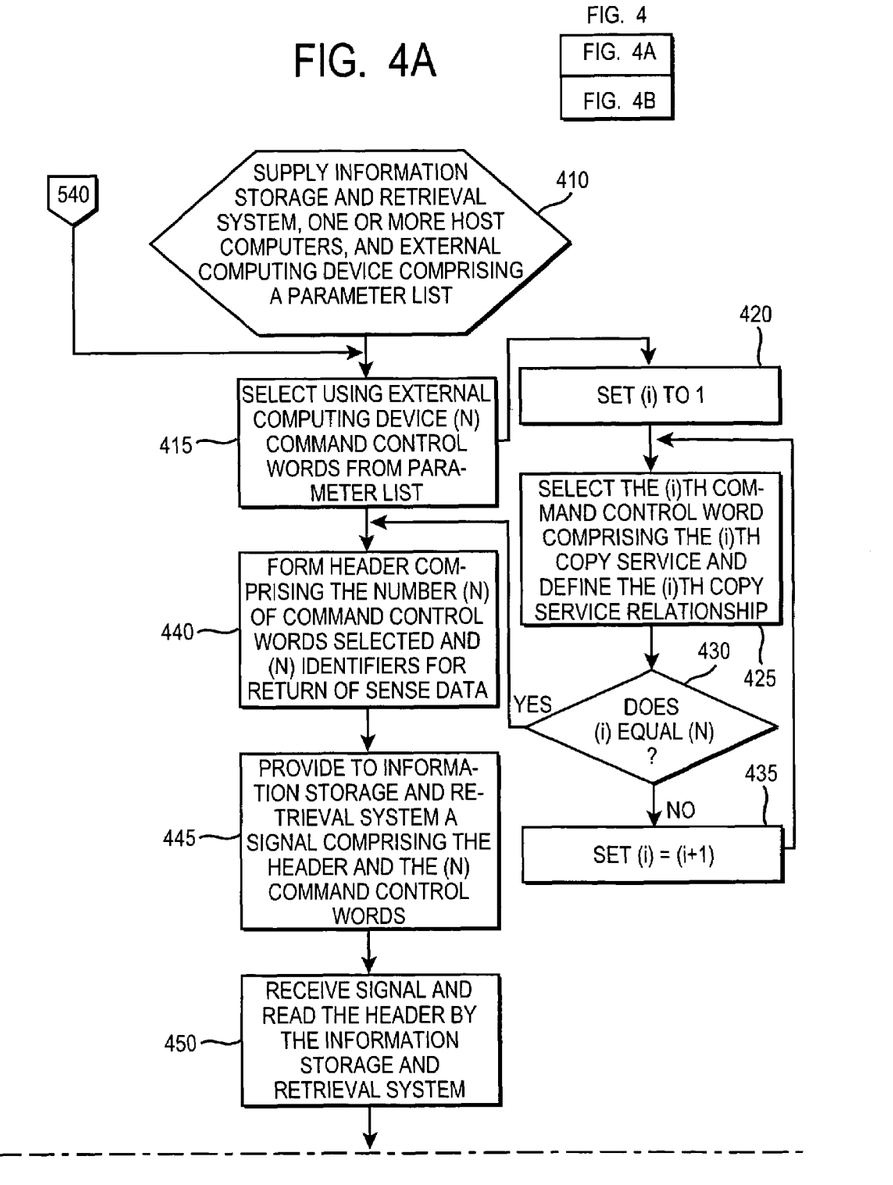
FIG. 4A is a flow chart summarizing the steps of Applicants' method.

Applicants' invention comprises a method to provide commands to a data storage and retrieval system without using one or more first communication links, i.e. without using one or more data channels. Referring now to FIG. 4, in step 410 Applicants' method supplies a data storage and retrieval system, such as for example system 100 (FIGS. 1, 2), comprising one or more data storage devices, where that data storage and retrieval system is in communication with one or more host computers, such as host computer 390 (FIG. 2) via one or more data channels, such as for example first communication link 395 (FIG. 2). Step 410 further comprises supplying a computing device, such as computing device 210, wherein that computing device is external to the data storage and retrieval system, and wherein that computing device is external to the one or more host computers interconnected with the data storage and retrieval system.

In certain embodiments, computing device 210 comprises a mainframe computer. In certain embodiments, computing device 210 comprises a personal computer. Computing device 210 comprises an operating system 212, processor 214, and a parameter list 216. Parameter list 216 comprises a listing of command control words. Each of those command control words comprises one or more executable functions. In certain embodiments, each of the command control words comprises one or more executable functions that cause Applicants' data storage and retrieval system to execute one or more read functions, one or more write functions, one or more copy functions, one or more data migration functions, and the like.

In certain embodiments, parameter list 216 comprises a plurality of copy services. In certain embodiments, that plurality of copy services comprises one or more flashcopy services, one or more peer-to-peer copy services, one or more peer-to-peer extended distance copy services, one or more extended remote copy services, and one or more concurrent copy services. An IBM publication entitled "IBM TotalStorage Enterprise Storage Server Implementing ESS Copy Services With IBM eServer zSeries" (September 2003) further described the above-recited copy services, and is hereby incorporated by reference herein.

In step 415, Applicants' method selects using the computing device of step 410, such as for example computing device 210 (FIG. 2), (N) command control words from the parameter list disposed therein, wherein (N) is greater than or equal to 1. In certain embodiments, step 415 is performed manually using external computing device 210. In certain embodiments, a processor, such as processor 214, disposed in external computing device 210 executes instructions 218 to perform step 415.

Applicants' method transitions from step 415 to step 440. In certain embodiments, step 415 further comprises steps 420, 425, 430, and optionally step 435.

In step 420, Applicants' method sets (i) to 1. In step 425, Applicants' method selects from parameter list 216 the (i)th command control word, wherein that (i)th command control word comprises the (i)th copy service. In certain embodiments, step 420 further comprises defining a copy services relationship. By "defining a copy services relationship," Applicants mean defining a source volume and a target volume. In certain embodiments, the source volume comprises a physical volume. In certain embodiments, the source volume comprises a logical volume. In certain embodiments, the target volume comprises a physical volume. In certain embodiments, the target volume comprises a logical volume. In certain embodiments, step 420 further comprises creating a metadata structure to map source and target volumes.

In certain embodiments, step 425 is performed manually using external computing device 210. In certain embodiments, a processor, such as processor 214, disposed in external computing device 210 executes instructions 218 to perform step 425.

Applicants' method transitions from step 425 to step 430 wherein the method determines if each of the (N) command control words has been selected, i.e. if (i) equals (N). In certain embodiments, step 430 is performed by computing device 210. In certain embodiments, step 430 is performed manually using external computing device 210. In certain embodiments, a processor, such as processor 214, disposed in external computing device 210 executes instructions 218 to perform step 430.

If Applicants' method determines in step 430 that (i) does not equal (N), then the method transitions from step 430 to step 435 wherein the method increments (i) by unity. In certain embodiments, step 430 is performed manually. In certain embodiments, a processor, such as processor 214, disposed in external computing device 210 executes instructions 218 to perform step 430. Applicants' method transitions from step 435 to step 425 and continues as described herein.

If Applicants' method determines in step 430 that (i) does equal (N), then the method transitions from step 430 to step 440 wherein the method forms a header comprising the number (N) of command control words selected in step 415, and (N) identifiers for return of sense data. In certain embodiments, step 440 is performed manually using external computing device 210. In certain embodiments, a processor, such as processor 214, disposed in external computing device 210 executes instructions 218 to perform step 440.

In step 445, Applicants' method provides to the interconnected data storage and retrieval system a command signal comprising the header of step 440 and the selected command control words selected in step 415. Step 445 further comprises sending that command signal via a second communication link, such as second communication link 220 (FIG. 2), wherein that second communication link is not used to provide data to the data storage and retrieval system, and wherein that second communication link does not interconnect to a host adapter disposed in the receiving data storage and retrieval system.

In certain embodiments, step 445 is performed manually using external computing device 210. In certain embodiments, a processor, such as processor 214, disposed in external computing device 210 executes instructions 218 to perform step 445.

The following example is presented to further illustrate to persons skilled in the art how to make and use the invention. This example is not intended as a limitation, however, upon the scope of the invention, which is defined only by the appended claims.

EXAMPLE 1

Figure 3:
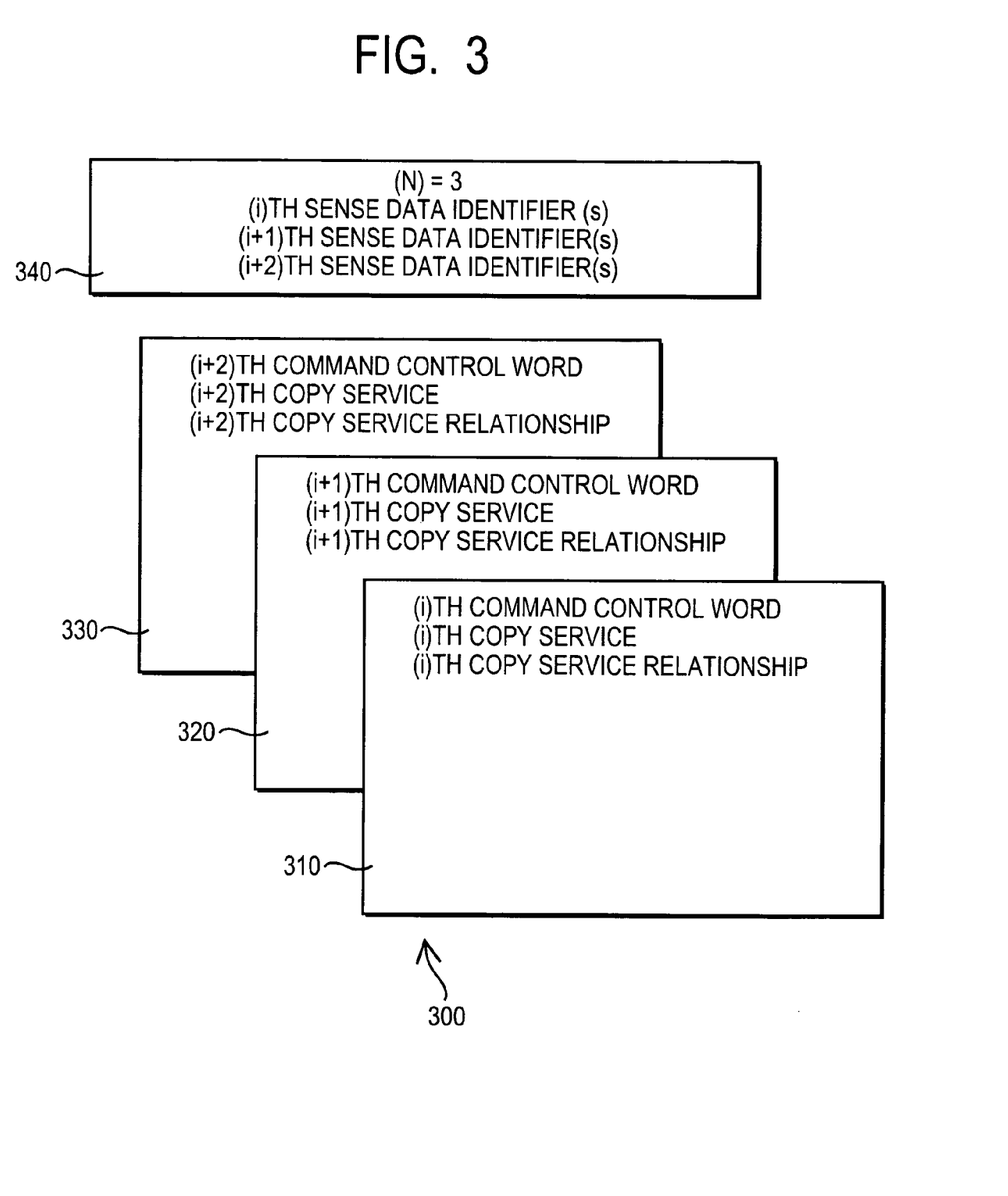
FIG. 3 is a block diagram the contents of a command signal generated by the computing device of FIG. 2, and provided by that computing device to the data storage and retrieval system of FIG. 1.

In the illustrated embodiment of FIG. 3, command signal 300 comprises a first command control word 310, a second command control word 320, a third command control word 330, and header 340.

Command control word 310, comprising the (i)th command control word of signal 300, comprises the (i)th copy service and the (i)th copy service relationship. Command control word 320, comprising the (i+1)th command control word of signal 300, comprises the (i+1)th copy service and the (i+1)th copy service relationship. Command control word 330, comprising the (i+2)th command control word of signal 300, comprises the (i+2)th copy service and the (i+3)th copy service relationship.

Header 340 comprises the number (N) of command control words in the command signal. In the illustrated embodiment of FIG. 3, (N) is 3. Header 340 further comprises one or more (i)th sense data identifiers. The (i)th sense data comprises information generated by a data storage and retrieval system after executing the (i)th command control word. In certain embodiments, the (i)th sense data comprises a series of numbers, wherein that series of numbers can be decoded to indicate whether the (i)th command control word was successfully executed. In certain embodiments, if the (i)th sense data comprises only zeros, then the (i)th sense data indicates that the (i)th command control word was successfully executed. In the illustrated embodiment of FIG. 3, header 340 further comprises one or more (i+1)th sense data identifiers, and one or more (i+2)th sense data identifiers.

Figure 4B:
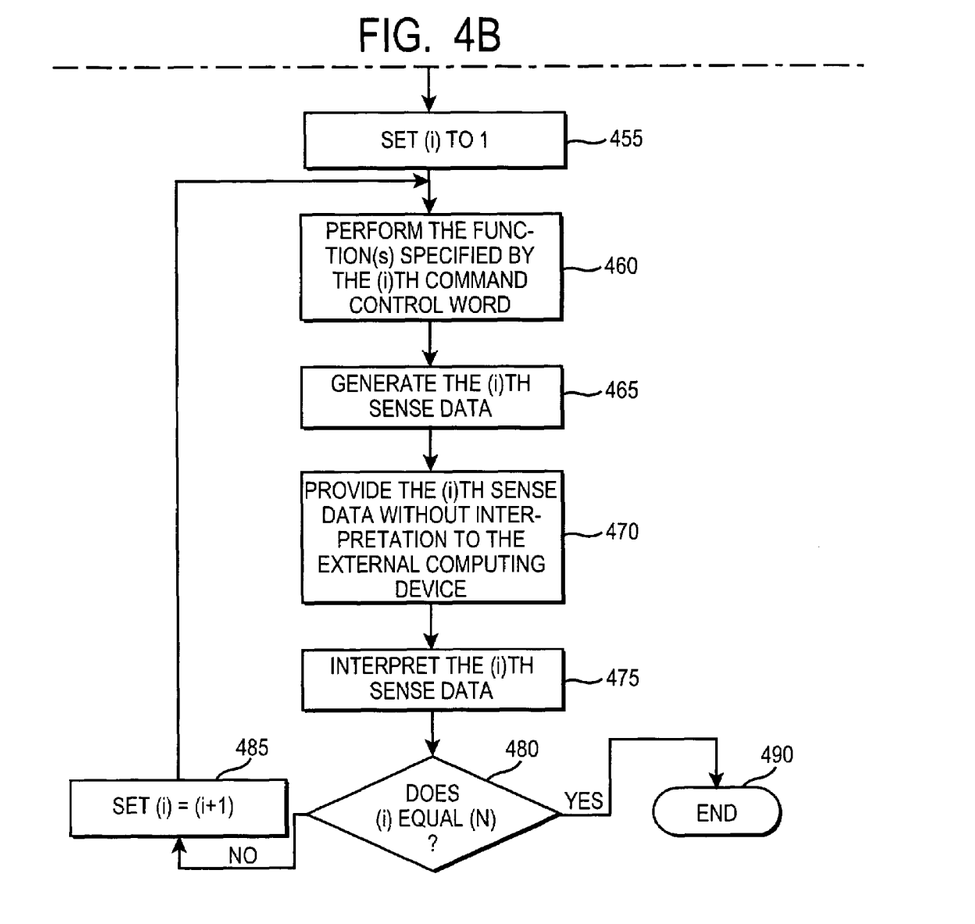
FIG. 4B is a flow chart summarizing additional steps of Applicants' method.

Referring again to FIG. 4, in step 450 the data storage and retrieval system receiving the command signal provided in step 445 reads the header portion formed in step 440. In certain embodiments, step 450 is performed by a processor, such as processor 132 and/or 142, disposed in the receiving data storage and retrieval system, such as system 100.

Applicants' method transitions from step 450 to step 455 wherein the method sets (i) equal to 1. In certain embodiments, step 455 is performed by a processor, such as processor 132 and/or 142, disposed in the receiving data storage and retrieval system, such as system 100.

Applicants' method transitions from step 455 to step 460 wherein the method executes the one or more functions specified by the (i)th command control word. In certain embodiments, step 460 is performed by a processor, such as processor 132 and/or processor 142, disposed in the receiving data storage and retrieval system, such as system 100.

Applicants' method transitions from step 460 to step 465 wherein the method generates the (i)th sense data. In certain embodiments, step 465 is performed by a processor, such as processor 132 and/or 142, disposed in the receiving data storage and retrieval system, such as system 100.

Applicants' method transitions from step 465 to step 470 wherein the method provides the (i)th sense data without interpretation to (i)th sense data identifier recited in the header formed in step 440. In certain embodiments, the (i)th sense data identifier designates the external computing device supplied in step 410. In certain embodiments, the (i)th sense data identifier designates one or more host computers.

In certain embodiments, step 470 is performed each time step 465 is performed, i.e. (N) times, wherein each such transmission comprises a single expression of sense data. In other embodiments, step 470 is performed one time after steps 460 and 465 have been performed (N) times, wherein that single transmission of step 470 comprises (N) expressions of sense data.

In step 475, the (i)th sense data is interpreted by the device designed by the (i)th sense data identifier. Although step 475 is shown in FIG. 4 as being performed before step 480, step 475 may be performed at any time after performing step 470. In certain embodiments, step 475 is performed manually. In certain embodiments, step 475 is performed by, a processor, such as processor 214, disposed in external computing device 210 using instructions 218.

In step 480, Applicants' method determines if each of the (N) command control words received in step 450 has been executed, i.e. if (i) equals (N). In certain embodiments, step 480 is performed by a processor, such as processor 132 and/or 142, disposed in the receiving data storage and retrieval system, such as system 100.

If Applicants' method determines in step 480 that (i) does not equal (N), then the method transitions from step 480 to step 485 wherein the method increments (i) by unity. In certain embodiments, step 485 is performed by a processor, such as processor 132 and/or 142, disposed in the receiving data storage and retrieval system, such as system 100. Applicants' method transitions from step 485 to step 460 and continues as described herein. If Applicants' method determines in step 480 that (i) does equal (N), then the method transitions from step 480 to step 490 and ends.

Figure 5:
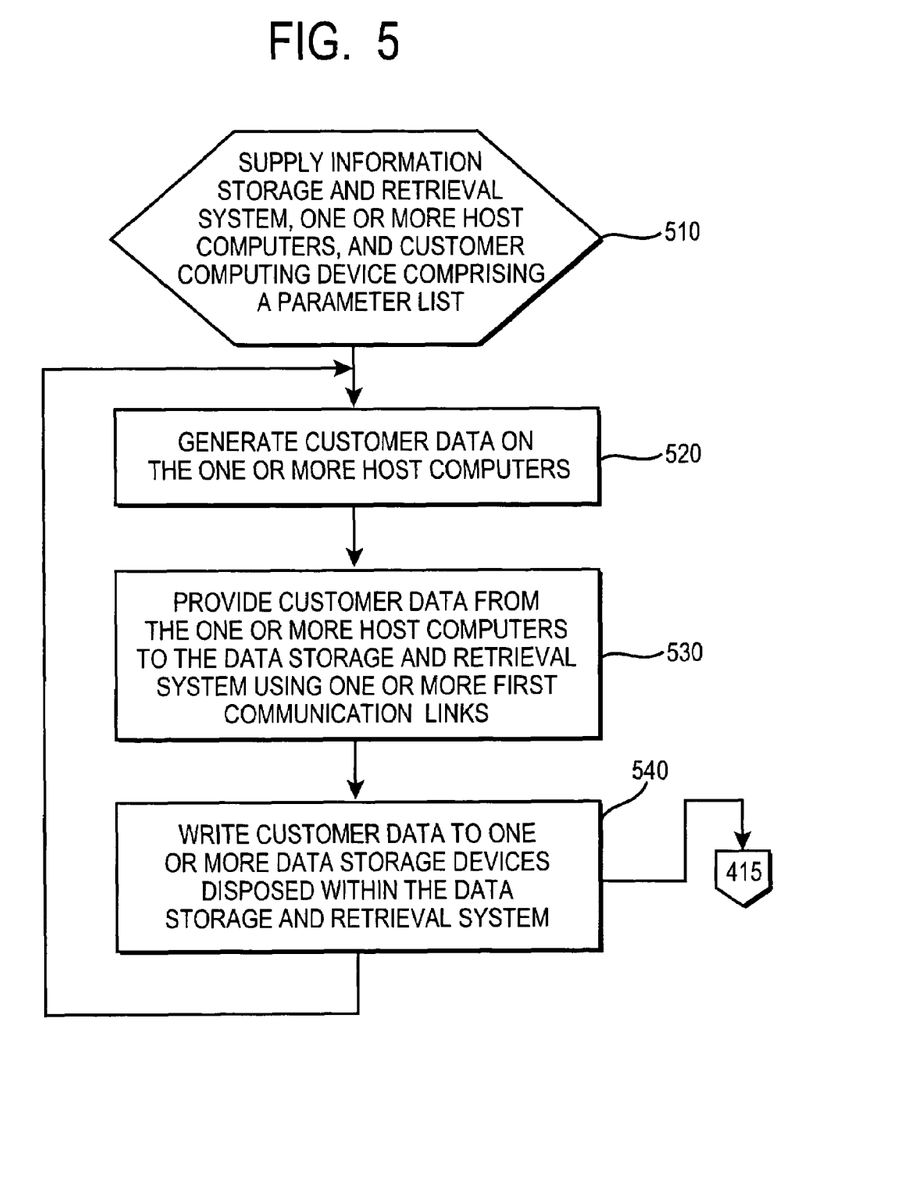
FIG. 5 is a flow chart summarizing certain additional steps in Applicants' method.

Using Applicants' apparatus and method allows a storage services provider to provide data storage services to one or more data storage customers. Referring now to FIG. 5, in step 510 Applicants' method provides an data storage and retrieval system owned and/or operated by a data storage services provider, one or more host computers owned and/or operated by one or more data storage customers, and a computing device owned and/or operated by one of the one or more data storage customers, wherein the one or more host computers communicate bidirectionally with the data storage and retrieval system using one or more first communication links, such as for example communication link 395 (FIG. 2). Data, as defined herein, and commands, as defined herein, are provided to the data storage and retrieval system by the one or more host computers using the one or more first communication links.

The customer computing device, such as computing device 210 (FIG. 2), is external to the data storage and retrieval system, and is external to each of the one or more host computers. Commands but not data is provided to the data storage and retrieval system by the customer external computing device using a second communication link, such as second communication link 220 (FIG. 2).

In step 520, Applicants' method generates customer data by the one or more host computers. In step 530, Applicants' method provides customer data from the one or more host computers to the data storage and retrieval system using one or more first communication links. In step 540, Applicants' method writes customer data to one or more data storage devices disposed within the data storage and retrieval system.

The method of FIG. 5 is an on-going process wherein steps 520, 530, and 540, are performed on an as-needed basis. Using the customer computing device, a data storage services customer may elect to provide one or more commands to the data storage and retrieval system, wherein the method of FIG. 5 transitions to step 415 (FIG. 4), and the method continues as described herein. The illustrated embodiment of FIG. 5 shows a transition from step 540 to step 415. In other embodiments, the on-going process of FIG. 5 can transition to step 415 at any time during any of the steps 520, 530, and/or 540.

In certain embodiments, individual steps recited in FIG. 4 and/or FIG. 5 may be combined, eliminated, or reordered.

In certain embodiments, Applicants' invention includes instructions, such as instructions 218 (FIG. 2), where those instructions are executed by a processor, such as processor 212 (FIG. 2), to perform one or more of steps 415, 420, 425, 430, 435, 440, and/or 445, recited in FIG. 4. In certain embodiments, Applicants' invention includes instructions, such as instructions 135 (FIG. 1) and/or instructions 145 (FIG. 1), where those instructions are executed by a processor, such as processor 132 (FIG. 1) and/or 142 (FIG. 1), respectively, to perform one or more of steps 450, 455, 460, 465, 470, 475, 480, and/or 485, recited in FIG. 4.

In other embodiments, Applicants' invention includes instructions residing in any other computer program product, where those instructions are executed by a computer external to system 100 and external to each host computer in communication with system 100, to perform one or more of steps 415, 420, 425, 430, 435, 440, and/or 445, recited in FIG. 4. In other embodiments, Applicants' invention includes instructions residing in any other computer program product, where those instructions are executed by a computer external to, or internal to, system 100, to perform one or more of steps 450, 455, 460, 465, 470, 475, 480, and/or 485, recited in FIG. 4.

In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to provide copy commands to a data storage and retrieval system, comprising the steps of:
   supplying a plurality of host computers owned by a plurality of data storage customers wherein each host computer comprises a storage management program;

supplying a data storage and retrieval system owned by a data storage services provider and comprising a plurality of data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said host computers and said host adapter;

supplying a computing device owned by one of the data storage customers, wherein said computing device is external to data storage and retrieval system, and wherein said computing device is external to each of said plurality of host computers;

supplying a second communication link interconnecting said computing device and said data storage and retrieval system;

generating by said computing device a command signal, wherein said command signal comprises a plurality of copy commands and a header;

providing said command signal to said data storage and retrieval system via said second communication link;

wherein said second communication link is not used to provide data; and wherein said data communication link is not used to provide copy commands.

2. The method of claim 1, further comprising the steps of:
providing data to said data storage and retrieval system using said data communication link; and
not providing data to said data storage and retrieval system using said second communication link.

3. The method of claim 1, further comprising the steps of:
receiving said command signal by said data storage and retrieval system;
reading said header by said data storage and retrieval system;
executing seriatim by said information storage and retrievals system said one or more command control words.

4. The method of claim 1, wherein:
said computing device comprises a parameter list comprising a plurality of copy services;
said method further comprises generating (N) command control words, wherein (N) is greater than or equal to 1;
forming, for each value of (i), an (i)th command control word comprising an (i)th copy service and an (i)th copy service relationship, wherein said (i)th copy service is selected from said parameter list, and wherein (i) is greater than or equal to 1 and less than or equal to (N).

5. The method of claim 4, wherein said parameter list comprises:
a flashcopy copy service;
a peer to peer copy service;
a peer to peer extended distance copy service;
an extended remote copy service; and
a concurrent copy service.

6. The method of claim 4, further comprising generating a header comprising:
a number (N) of command control words;
for each value of (i), an (i)th copy service relationship;
for each value of (i), an identifier for return of (i)th sense data.

7. The method of claim 6, further comprising the steps of:
receiving said command signal by said data storage and retrieval system;
reading said header by said data storage and retrieval system.

8. The method of claim 7, further comprising the steps of:
setting (i) to 1;
selecting the (i)th command control word;
establishing an (i)th copy service relationship;
executing an (i)th copy service.

9. The method of claim 8, further comprising the steps of:
generating (i)th sense data;
providing said (i)th sense data to said computing device using said second communication link;
interpreting said (i)th sense data by said computing device.

10. An article of manufacture comprising an information storage medium having computer readable program code encoded therein to provide copy commands to a data storage and retrieval system owned by a data storage services provider and in communication with a plurality of host computers owned by a plurality of data storage customers, said data storage and retrieval system comprising one or more data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said plurality of host computer and said said host adapter, and wherein a second communication link interconnects said article of manufacture to said data storage and retrieval system, wherein said article of manufacture is owned by one of said plurality of data storage customers, the computer readable program code comprising a series of computer readable program steps to effect:

generating a command signal, wherein said command signal comprises a plurality of copy commands and a header;

providing said command signal to said data storage and retrieval system via said second communication link;

wherein said second communication link is not used to provide data; and wherein said data communication link is not used to provide copy commands.

11. The article of manufacture of claim 10, wherein said computer readable program code does not comprise a series of computer readable program steps to provide data to said data storage and retrieval system using said second communication link.

12. The article of manufacture of claim 10, wherein said article of manufacture further comprises a parameter list comprising a plurality of copy services, the computer readable program code comprising a series of computer readable program steps to effect:

generating (N) command control words, wherein (N) is greater than or equal to 1;

forming, for each value of (i), an (i)th command control word comprising an (i)th copy service and an (i)th copy service relationship, wherein said (i)th copy service is selected from said parameter list, and wherein (i) is greater than or equal to 1 and less than or equal to (N).

13. The article of manufacture of claim 12, wherein said parameter list comprises:
a flashcopy copy service;
a peer to peer copy service;
a peer to peer extended distance copy service;
an extended remote copy service; and
a concurrent copy service.

14. The article of manufacture of claim 12, wherein said header comprises:
the number (N) of command control words;
for each value of (i), an (i)th copy service relationship;

for each value of (i), an identifier for return of (i)th sense data.

15. The article of manufacture of claim 12, said computer readable program code further comprising a series of computer readable program steps to effect:
   receiving sense data for each of said (N) command control words;
   interpreting said sense data.

16. An article of manufacture owned by a data storage services provider and in communication with a plurality of host computers owned by a plurality of data storage customers, said article of manufacture comprising a plurality of data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said plurality of host computer and said host adapter, and an information storage medium having computer readable program code encoded therein to receive command signals from an external computing device owned by one of said plurality of data storage customers, and wherein a second communication link interconnects said article of manufacture to said computing device, wherein said computing device is external to said host computer, wherein the computing device provides commands but not data to said article of manufacture, the computer readable program code comprising a series of computer readable program steps to effect:
   receiving a command signal from said computing device, wherein said command signal comprises (N) copy commands and a header;
   reading said header;
   executing seriatim said (N) copy commands;
   wherein (N) is greater than or equal to 1;
   wherein said second communication link is not used to provide data; and
   wherein said data communication link is not used to provide copy commands.

17. The article of manufacture of claim 16, said computer readable program code further comprising a series of computer readable program steps to effect:
   selecting, for each value of (i), an (i)th command control word;
   establishing, for each value of (i), an (i)th copy service relationship;
   executing, for each value of (i), an (i)th copy service;
   wherein (i) is greater than or equal to 1 and less than or equal to (N).

18. The article of manufacture of claim 17, said computer readable program code further comprising a series of computer readable program steps to effect:
   generating (i)th sense data;
   providing said (i)th sense data to said computing device using said second communication link.

19. A computer program product, including computer readable program code, encoded in an information storage medium and usable with a programmable computer processor to provide commands from a computing device to a data storage and retrieval system owned by a data storage services provider and in communication with a plurality of host computers owned by a plurality of data storage customers, said data storage and retrieval system comprising a plurality of data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said plurality of host computers and said host adapter, and wherein a second communication link interconnects said computing device to said data storage and retrieval system, and wherein said computing device is owned by one of said plurality of data storage customers, comprising:
   computer readable program code which causes said programmable computer processor to generate a command signal, wherein said command signal comprises a plurality of copy commands and a header;
   computer readable program code which causes said programmable computer processor to provide said command signal to said data storage and retrieval system via said second communication link;
   wherein said second communication link is not used to provide data; and
   wherein said data communication link is not used to provide copy commands.

20. The computer program product of claim 19, wherein said computing device further comprises a parameter list comprising a plurality of copy services, further comprising:
   computer readable program code which causes said programmable computer processor to generate (N) command control words, wherein (N) is greater than or equal to 1;
   computer readable program code which causes said programmable computer processor to form, for each value of (i), an (i)th command control word comprising the (i)th copy service and an (i)th copy service relationship, wherein said (i)th copy service is selected from said parameter list, and wherein (i) is greater than or equal to 1 and less than or equal to (N).

21. The computer program product of claim 20, wherein said parameter list comprises:
   a flashcopy copy service;
   a peer to peer copy service;
   a peer to peer extended distance copy service;
   an extended remote copy service; and
   a concurrent copy service.

22. The computer program product of claim 20, wherein said header comprises:
   the number (N) of command control words;
   for each value of (i), an (i)th copy service relationship;
   for each value of (i), an identifier for return of (i)th sense data.

23. The computer program product of claim 20, further comprising:
   computer readable program code which causes said programmable computer processor to receive sense data from said data storage and retrieval system for each of said (N) command control words;
   computer readable program code which causes said programmable computer processor to interpret said sense data.

24. A computer program product, including computer readable program code, encoded in an information storage medium and usable with a programmable computer processor to receive commands from a computing device by a data storage and retrieval system owned by a data storage services provider and in communication with a plurality of host computers owned by a plurality of data storage customers, said data storage and retrieval system comprising one or more data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said plurality of host computer and said host adapter, and wherein a second communication link interconnects said computing device to said data storage and retrieval system, and wherein said computing device provides commands but not data using said second communication link, and wherein said computing device is owned by one of said plurality of data storage customers, comprising:

computer readable program code which causes said programmable computer processor to receive using said second communication link a command signal from said computing device, wherein said command signal comprises (N) command control words and a header;

computer readable program code which causes said programmable computer processor to read said header;

computer readable program code which causes said programmable computer processor to execute seriatim said (N) command control words;

wherein (N) is greater than or equal to 1;

wherein said second communication link is not used to provide data; and     wherein said data communication link is not used to provide copy commands.

25. The computer program product of claim 24, further comprising:

computer readable program code which causes said programmable computer processor to select, for each value of (i), an (i)th command control word;

computer readable program code which causes said programmable computer processor to establish an (i)th copy service relationship;

computer readable program code which causes said programmable computer processor to execute an (i)th copy service, wherein (i) is greater than or equal to 1 and less than or equal to (N).

26. The computer program product of claim 25, further comprising:

computer readable program code which causes said programmable computer processor to generate (i)th sense data;

computer readable program code which causes said programmable computer processor to provide said (i)th sense data to said computing device using said second communication link.

27. A method to provide data storage services to one or more data storage customers by a storage services provider, comprising the steps of:

supplying a data storage and retrieval system owned by said storage services provider and in communication with a plurality of host computers owned by a plurality of data storage customers, said data storage and retrieval system comprising one or more data storage devices, a host adapter, a processor, a third communication link interconnecting said host adapter and said processor, a data cache, a fourth communication link interconnecting said host adapter and said data cache, a web server, a fifth communication link interconnecting said web server and said processor, wherein a data communication link interconnects one of said plurality of host computer and said host adapter, and a data communication link interconnecting a host computer and said data storage and retrieval system;

supplying a customer computing device disposed external to said one or more host computers and external to said data storage and retrieval system, wherein said customer computing device is owned by one of said plurality of data storage customers;

providing customer data from said host computer to said data storage and retrieval system using said data communication link;

writing said customer data to said one or more data storage devices;

supplying a second communication link interconnecting said customer computing device and said data storage and retrieval system, wherein said customer computing device is external to said data storage and retrieval system, and wherein said customer computing device is external to each of said one or more host computers;

generating by said customer computing device a command signal, wherein said command signal comprises a plurality of copy commands and a header;

providing said command signal by said customer computing device to said data storage and retrieval system via said second communication link;

wherein said second communication link is not used to provide data; and     wherein said data communication link is not used to provide copy commands.

28. The method of claim 27, further comprising the steps of:

receiving said command signal by said data storage and retrieval system;

reading said header by said data storage and retrieval system;

executing seriatim by said information storage and retrievals system said one or more command control words.

29. The method of claim 28, further comprising the steps of:

generating sense data;

providing said sense data to said customer computing device using said second communication link;

interpreting said sense data by said customer computing device.

* * * * *

UNITED STATES PATENT AND TRADEMARK OFFICE
CERTIFICATE OF CORRECTION

PATENT NO. : 7,657,714 B2  Page 1 of 1
APPLICATION NO. : 11/219476
DATED : February 2, 2010
INVENTOR(S) : Blea et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Thirtieth Day of November, 2010

David J. Kappos
*Director of the United States Patent and Trademark Office*